(12) United States Patent
Tsuda et al.

(10) Patent No.: US 11,982,852 B2
(45) Date of Patent: May 14, 2024

(54) OPTICAL CABLE LAYING CONSTRUCTION METHOD AND OPTICAL CABLE LAYING CONSTRUCTION SET

(71) Applicant: NITTO DENKO CORPORATION, Osaka (JP)

(72) Inventors: Koichi Tsuda, Osaka (JP); Yusuke Shimizu, Osaka (JP); Yuhei Tanaka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/624,490

(22) PCT Filed: Jul. 3, 2020

(86) PCT No.: PCT/JP2020/026202
§ 371 (c)(1),
(2) Date: Jan. 3, 2022

(87) PCT Pub. No.: WO2021/006207
PCT Pub. Date: Jan. 14, 2021

(65) Prior Publication Data
US 2022/0390695 A1 Dec. 8, 2022

(30) Foreign Application Priority Data

Jul. 5, 2019 (JP) .................................. 2019-126085
Jul. 3, 2020 (JP) .................................. 2020-115369

(51) Int. Cl.
*G02B 6/245* (2006.01)
*G02B 6/25* (2006.01)
(Continued)

(52) U.S. Cl.
CPC ............ *G02B 6/4278* (2013.01); *G02B 6/245* (2013.01); *G02B 6/25* (2013.01); *G02B 6/3817* (2013.01);
(Continued)

(58) Field of Classification Search
CPC ........ G02B 6/245; G02B 6/25; G02B 6/3817; G02B 6/3885; G02B 6/4231;
(Continued)

(56) References Cited

U.S. PATENT DOCUMENTS 6,357,931 B1 * 3/2002 Shirakawa ........... G02B 6/4293
385/75
9,322,704 B1    4/2016 Neveux, Jr.
(Continued)

FOREIGN PATENT DOCUMENTS

CN    205139428 U    4/2016
JP    2007-025272 A    2/2007
(Continued)

OTHER PUBLICATIONS

International Search Report Issued in PCT/JP2020/026202 dated Aug. 4, 2020.
(Continued)

*Primary Examiner* — Ryan A Lepisto
(74) *Attorney, Agent, or Firm* — Edwards Neils LLC; Jean C. Edwards, Esq.

(57) ABSTRACT

An optical cable laying construction set (X) that includes an optical cable (C1) and plugs (P1 and P2). The optical cable (C1) includes an optical fiber which is a refractive index distribution-type plastic optical fiber. The plug (P1) includes a connecting portion connectable to the optical fiber, and an electric connector connectable to an external device, and has a configuration for converting an electric signal into an optical signal. The plug (P2) includes a connecting portion
(Continued)

connectable to the optical fiber, and an electric connector connectable to an external device, and has a configuration for converting an optical signal to an electric signal. In an optical cable laying construction method of the present invention, laying construction of the optical cable on site is carried out using the optical cable laying construction set (X).

12 Claims, 9 Drawing Sheets

(51) Int. Cl.
  *G02B 6/38* (2006.01)
  *G02B 6/42* (2006.01)
  *G02B 6/44* (2006.01)
  *G02B 6/50* (2006.01)
(52) U.S. Cl.
  CPC ......... *G02B 6/4231* (2013.01); *G02B 6/4246* (2013.01); *G02B 6/4293* (2013.01); *G02B 6/3885* (2013.01); *G02B 6/4284* (2013.01); *G02B 6/4403* (2013.01); *G02B 6/50* (2013.01)
(58) Field of Classification Search
  CPC .. G02B 6/4246; G02B 6/4278; G02B 6/4284; G02B 6/4293; G02B 6/4403; G02B 6/50
  See application file for complete search history.

(56) References Cited

U.S. PATENT DOCUMENTS

| | | | | |
|---|---|---|---|---|
| 2003/0235379 A1* | 12/2003 | Lin | ...................... | G02B 6/3817 385/101 |
| 2007/0014522 A1 | 1/2007 | Yamaguchi et al. | | |
| 2009/0003834 A1 | 1/2009 | Sato | | |
| 2012/0020609 A1* | 1/2012 | Kasai | ...................... | G02B 6/43 385/14 |
| 2013/0058661 A1* | 3/2013 | Greiss | .................. | G02B 6/4249 385/52 |
| 2013/0266280 A1 | 10/2013 | Sakabe et al. | | |
| 2018/0210158 A1* | 7/2018 | Leigh | ........................ | G06F 1/26 |

FOREIGN PATENT DOCUMENTS

| | | | |
|---|---|---|---|
| JP | 2007-178490 A | | 7/2007 |
| JP | 2009-037002 A | | 2/2009 |
| JP | 2009-524075 A | | 6/2009 |
| JP | 2012088356 A | * | 5/2012 |
| JP | 2013-061449 A | | 4/2013 |
| JP | 2013-218839 A | | 10/2013 |
| JP | 2020-071432 A | | 5/2020 |
| WO | 2007/083553 A1 | | 7/2007 |

OTHER PUBLICATIONS

Written Opinion Issued in PCT/JP2020/026202 dated Aug. 4, 2020.
International Preliminary Report on Patentability issued by WIPO dated Jan. 11, 2022, in connection with International Patent Application No. PCT/JP2020/026202.
Office Action, issued by the China National Intellectual Property Administration on Dec. 29, 2023, in connection with Chinese Patent Application No. 202080048986.3.
Office Action, issued by the Japanese Patent Office on Feb. 13, 2024, in connection with Japanese Patent Application No. 2020-115369.
Decision to Grant a Patent, issued by the Japanese Patent Office on Apr. 2, 2024, in connection with Japanese Patent Application No. 2020-115369.

* cited by examiner

OPTICAL CABLE LAYING CONSTRUCTION METHOD AND OPTICAL CABLE LAYING CONSTRUCTION SET

CROSS-REFERENCE TO RELATED APPLICATIONS

The present application is a 35 U.S.C. 371 National Stage Entry of: PCT/JP2020/026202, filed on Jul. 3, 2020, which claims priority from Japanese Patent Application Nos. 2019-126085, filed on Jul. 5, 2019, and 2020-115369, filed on Jul. 3, 2020, the contents of all of which are herein incorporated by reference in their entirety.

TECHNICAL FIELD

The present invention relates to an optical cable laying construction method and an optical cable laying construction set.

BACKGROUND ART

For video transmission such as long distance HDMI (high-definition multimedia interface) transmission, an optical cable having plugs for device connection at both ends has been conventionally used. Each plug has a built-in opto-electric conversion module. Such a technique relating to the optical cable is, for example, described in Patent Document 1 below.

CITATION LIST

Patent Document

Patent Document 1: Japanese Unexamined Patent Publication No. 2013-61449

SUMMARY OF THE INVENTION

Problem to be Solved by the Invention

Optical cables for video transmission may be laid through a narrow space in the piping, in the wall, under the floor, etc., between devices for video transmission and reception. However, the end plug of the optical cable may be difficult or may fail to pass through a narrow space. Although such a conventional end plug of the optical cable for video transmission requires miniaturization, there is a limit to its miniaturization.

Further, in the conventional optical cable for video transmission, the optical cable actually laid between the devices is too long with respect to the cable length required for connection between the devices, and there is a case where the cable surplus becomes an obstacle.

The present invention provides an optical cable laying construction method and an optical cable laying construction set that, in the laying of the optical cable, allow an optical cable to easily pass through a narrow space and are suitable for suppressing the surplus of the optical cable after laying.

Means for Solving the Problem

The present invention (1) includes an optical cable laying construction method for connecting external devices by an optical cable using an optical cable laying construction set, the optical cable laying construction set including an optical cable including a refractive index distribution-type plastic optical fiber and a cable jacket; a first plug including a first connecting portion and an electric connector, and having a configuration for converting an electric signal into an optical signal, the first connecting portion being connectable to the plastic optical fiber, the electric connector being connectable to an external device; and a second plug including a second connecting portion and an electric connector, and having a configuration for converting an optical signal into an electric signal, the second connecting portion being connectable to the plastic optical fiber, the electric connector being connectable to an external device, the optical cable laying construction method including a laying step of laying the optical cable; a first removal step of removing, in a one-end portion of the optical cable, a cable jacket so that the plastic optical fiber extends outside the cable jacket; a first connecting step of connecting the plastic optical fiber extending outside the cable jacket in the one-end portion to the first connecting portion of the first plug; a second removal step of removing, in an other-end portion of the optical cable, the cable jacket so that the plastic optical fiber extends outside the cable jacket; and a second connecting step of connecting the plastic optical fiber extending outside the cable jacket in the other-end portion to the second connecting portion of the second plug.

According to the optical cable laying construction method, in the laying step, it is possible to lay the optical cable between the external devices before the plugs are attached to both end portions of the optical cable. The optical cable with no plug on the cable end easily passes through a narrow space in the piping, in the wall, under the floor, etc.

Further, according to the present method, it is possible to adjust a length of the optical cable by cutting the cable as needed after laying the optical cable between the external devices and before attaching the plugs to both end portions of the optical cable. Such a method is suitable for suppressing the surplus of the optical cable after laying.

As described above, in the laying of the optical cable, the present method allows the optical cable to easily pass through a narrow space, and is suitable for suppressing the surplus of the optical cable after laying.

The present invention (2) includes the optical cable laying construction method described in (1) further including a step of cutting the optical cable before the first removal step and/or the second removal step.

According to such a configuration, it is possible to suppress the surplus of the optical cable after laying.

The present invention (3) includes the optical cable laying construction method described in (1) or (2), wherein in the first connecting step, the plastic optical fiber extending outside the cable jacket in the one-end portion is connected to the first connecting portion of the first plug through an optical connector.

Such a configuration is suitable for obtaining high connection reliability between the plastic optical fiber and the first plug.

The present invention (4) includes the optical cable laying construction method described in any one of (1) to (3), wherein in the second connecting step, the plastic optical fiber extending outside the cable jacket in the other-end portion is connected to the second connecting portion of the second plug through an optical connector.

Such a configuration is suitable for obtaining high connection reliability between the plastic optical fiber and the second plug.

The present invention (5) includes an optical cable laying construction set including an optical cable including a refractive index distribution-type plastic optical fiber and a cable jacket; a first plug including a first connecting portion and an electric connector, and having a configuration for converting an electric signal into an optical signal, the first connecting portion being connectable to the plastic optical fiber, the electric connector being connectable to an external device; and a second plug including a second connecting portion and an electric connector, and having a configuration for converting an optical signal into an electric signal, the second connecting portion being connectable to the plastic optical fiber, the electric connector being connectable to an external device.

Such an optical cable laying construction set can be used in the optical cable laying construction method according to the present invention (1). Therefore, according to the optical cable laying construction set, in the optical cable laying construction using this set, the same advantages as described above regarding the optical cable laying construction method is obtained.

The present invention (6) includes the optical cable laying construction set described in (5), wherein the plastic optical fiber includes a core, a clad around the core, and an over clad around the clad, wherein the core and the clad have an elastic modulus of 0.5 to 20 GPa, wherein the over clad has an elastic modulus of 0.5 to 10 GPa.

Such a configuration is suitable for obtaining an excellent cut end surface, whose flatness is ensured for optical connection, of the optical fiber when the optical cable is cut with, for example, a cutter at the optical cable laying construction site.

The present invention (7) includes the optical cable laying construction set described in (5) or (6) further including an optical connector for connecting the plastic optical fiber of the optical cable to the first connecting portion of the first plug.

Such a configuration is suitable for obtaining high connection reliability between the plastic optical fiber and the first plug.

The present invention (8) includes the optical cable laying construction set described in any one of (5) to (7) further including an optical connector for connecting the plastic optical fiber of the optical cable to the second connecting portion of the second plug.

Such a configuration is suitable for obtaining high connection reliability between the plastic optical fiber and the second plug.

The present invention (9) includes the optical cable laying construction set described in any one of (5) to (8), wherein the optical cable includes an electric wire, wherein the first plug includes a third connecting portion connectable to the electric wire, wherein the second plug includes a fourth connecting portion connectable to the electric wire.

The optical cable laying construction set may include a hybrid configuration in which the plastic optical fiber and the electric wire are used in combination for signal transmission and reception.

DESCRIPTION OF EMBODIMENTS

Figure 1:
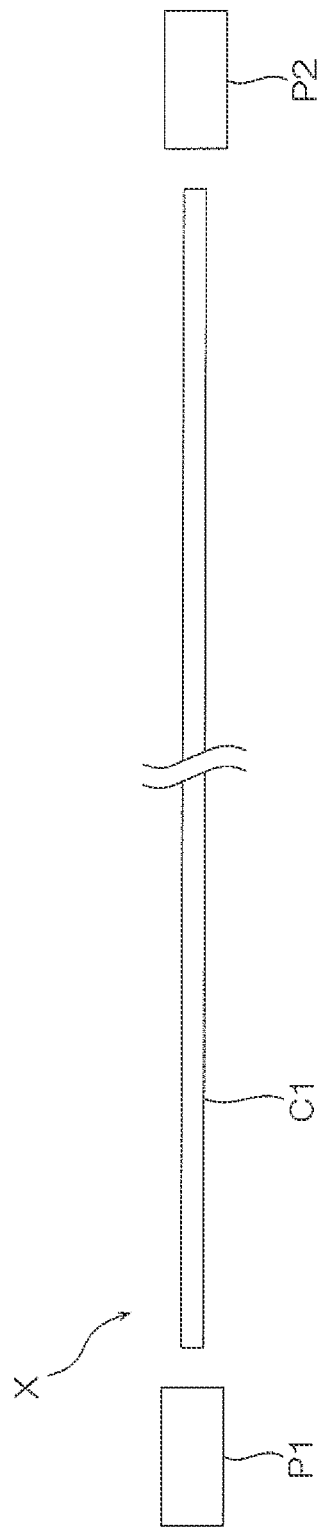
FIG. 1 shows a configuration schematic view of an optical cable laying construction set according to one embodiment of the present invention.

FIG. 1 shows a configuration schematic view of an optical cable laying construction set X according to one embodiment of the present invention. The optical cable laying construction set X includes an optical cable C1, a plug P1, and a plug P2.

Figure 2:
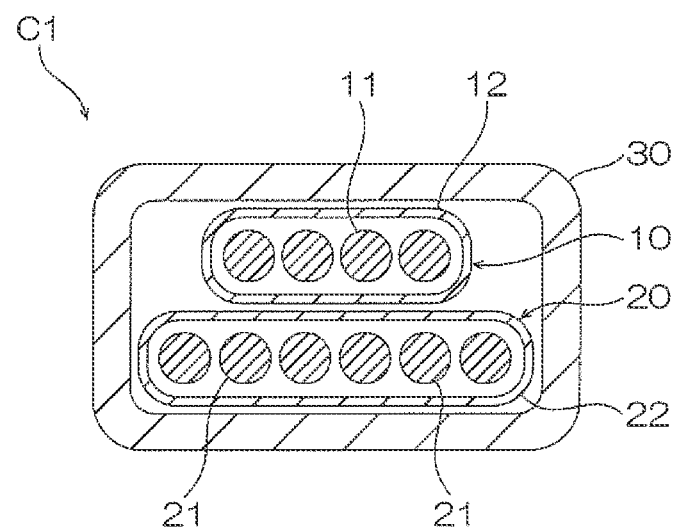
FIG. 2 shows a cross-sectional configuration view of one example of an optical cable shown in FIG. 1.

The optical cable C1 is a cable for video transmission such as HDMI transmission. The optical cable C1 has a hybrid configuration in which optical fibers and electric wires are used in combination for signal transmission and reception. As shown in FIG. 2, the optical cable C1 includes an optical cord 10, an electric cord 20, and a cable jacket 30. The optical cable C1 has a length of, for example, 2 to 200 m.

As shown in FIG. 2, the optical cord 10 includes a plurality of optical fibers 11 and a covering material 12. The number of optical fibers 11 in the optical cord 10 is, for example, four.

Figure 3:
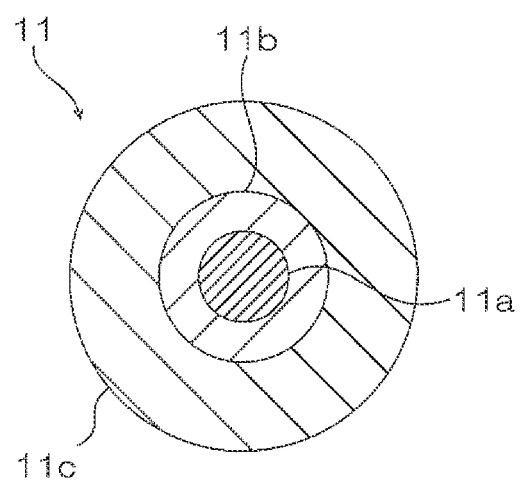
FIG. 3 shows a cross-sectional configuration view of an optical fiber shown in FIG. 2.

The optical fiber 11 is a refractive index distribution-type plastic optical fiber through which a plurality of optical signals can pass and, as shown in FIG. 3, has a core 11a, a clad 11b located around the core 11a, and an over clad 11c located around the clad 11b. The optical fiber 11 has a diameter of, for example, 100 to 1000 μm.

The core 11a has a higher refractive index than the clad 11b, and forms an optical transmission path itself. The refractive index of the core 11a is, for example, symmetrical about the central axis, where the refractive index decreases from the center of a cross section of the core 11a toward the clad 11b. Examples of a constituent material for the core 11a include flexible resin materials such as polymethyl methacrylate and polycarbonate. The clad 11b has a lower refractive index than the core 11a. Examples of a constituent material for the clad 11b include fluorine-containing polymers such as fluorine-containing polyimide. An example of a constituent material for the over clad 11c includes polycarbonate.

The core 11a and the clad 11b have an elastic modulus of 0.5 to 20 GPa, and the over clad 11c has an elastic modulus of 0.5 to 10 GPa, where the elastic modulus of these is defined as a value measured by a nanoindentation method. Such a configuration is suitable for obtaining an excellent cut end surface, whose flatness is ensured for optical connection, of the optical fiber 11 when the optical cable C1 is cut with, for example, a cutter.

Measurement of the elastic modulus by the nanoindentation method can be, for example, carried out using a nanoindenter (trade name: "Triboindenter", manufactured by Hysitron Inc.). In this measurement, conditions are set as follows: a measurement mode of single indentation measurement, a measurement temperature of 25° C., a use indenter of a Berkovich (triangular pyramid)-type diamond indenter, an indentation depth of the indenter with respect to a measurement target of 1000 nm, and an indentation rate of the indenter of 100 nm/second. The derivation of the elastic modulus based on the nanoindentation method is carried out with the device used. The measurement of the elastic modulus by the nanoindentation method can be carried out on an exposed cross-section of the optical fiber for measurement, where the cross-section is formed or exposed by an ultramicrotome device after embedding a cut piece of the optical fiber having a predetermined length, as a measurement target, in the resin.

The covering material 12 surrounds and protects the optical fiber 11. Examples of a constituent material for the covering material 12 include polyvinyl chloride, ethylene vinyl acetate copolymer, and polycarbonate.

The optical cord 10 may include a tensile strength member to prevent breaking of the optical fiber 11 due to a tensile force acting on the optical fiber 11. The tensile strength member is, for example, disposed so as to extend along the optical fibers 11 between the optical fibers 11 and the covering material 12. Examples of a constituent material for the tensile strength member include aramid fibers, such as poly-p-phenylene terephthalamide fibers; and polyester fibers, such as polyarylate fibers, polyparaphenylene benzbisoxazole fibers, and polyethylene terephthalate fibers.

The optical cord 10 may have a resin portion in which the optical fibers 11 are embedded and which extends along with the optical fibers 11, instead of the covering material 12. Such a resin portion is, for example, made of an ultraviolet curable resin. When the optical cord 10 has the resin portion, the above-described tensile strength member may be disposed in the resin portion so as to extend along the optical fibers 11.

The electric cord 20 includes a plurality of electric wires 21 and a covering material 22. An example of a constituent material for the electric wire 21 includes copper.

The electric wire 21 has a thickness of, for example, 26 to 32 in the AWG (American Wire Gauge) standard. The number of electric wires 21 in the electric cord 20 is, for example, six.

The covering material 22 surrounds and protects the electric wire 21. Examples of a constituent material for the covering material 22 include fluororesins such as a polyvinyl chloride and a tetrafluoroethylene/hexafluoride propylene copolymer.

The cable jacket 30 covers and protects the optical cord 10 and the electric cord 20. Examples of a constituent material for the cable jacket 30 include polyvinyl chloride and polyethylene.

Figure 4:
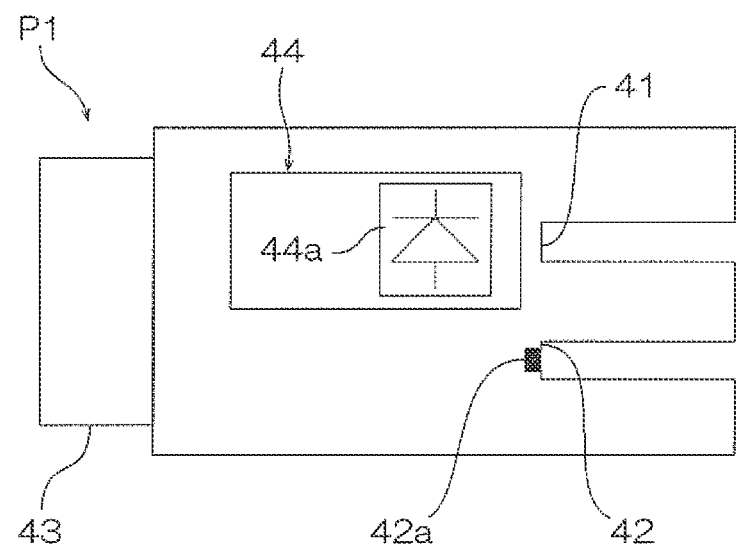
FIG. 4 shows a configuration schematic view of one example of a first plug shown in FIG. 1.

The plug P1 is a transmitting-side plug connected to a transmitting device of the video transmission, and as shown in FIG. 4, includes a connecting portion 41 connectable to the optical fibers 11, a connecting portion 42 connectable to the electric wires 21, and an electric connector 43 connectable to an external device. Further, the plug P1 includes an opto-electric conversion unit 44 for converting an electric signal into an optical signal. That is, the plug P1 has a configuration for converting the electric signal into the optical signal.

The connecting portion 41 is configured to be connectable to the optical fiber 11 in a form of being included in the optical cord 10, or is configured to be connectable to the optical fiber 11 in a form of being exposed outside the optical cord 10.

The connecting portion 42 is configured to be connectable to the electric wire 21 in a form of being included in the electric cord 20, or is configured to be connectable to the electric wire 21 in a form of being exposed outside the electric cord 20. The connecting portion 42 has the same number of terminals 42a as the electric wires 21 of the electric cord 20. The terminal 42a corresponds to the electric wire 21 one-to-one, and is contactable with the electric wire 21.

The electric connector 43 has a plurality of terminals (not shown). When the optical cable laying construction set X is for HDMI transmission, the number of terminals of the electric connector 43 is 19. A plurality of signal paths are formed between the electric connector 43 and the connecting portion 41, and a plurality of signal paths are formed between the electric connector 43 and the connecting portion 42.

The opto-electric conversion unit 44 includes the same number of light emitting elements 44a as the optical fibers 11 of the optical cord 10, and a drive circuit (not shown). The light emitting element 44a is, for example, a laser diode such as a vertical cavity surface emitting laser (VCSEL). Each light emitting element 44a is optically connected to the optical fiber 11 of the optical cord 10 one-to-one. In the opto-electric conversion unit 44, the light emitting element 44a may be, for example, disposed so that the emitted light therefrom directly reaches the connecting portion 41. Alternatively, the opto-electric conversion unit 44 may further include a lens-mirror material (not show) for bending the optical path at, for example, 90 degrees, and the light emitting element 44a may be disposed so that the light emitted from the light emitting element 44a reaches the connecting portion 41 through the lens-mirror material.

The plug P1 may have a single housing. When the plug P1 has the single housing, various elements (including the connecting portion 41, the connecting portion 42, the electric connector 43, and the opto-electric conversion unit 44) of the plug P1 are assembled into the housing. Alternatively, the plug P1 may have a configuration in which the first housing and the second housing are provided, and the first housing and the second housing are connected in a flexible manner. In this case, the plug P1 has, for example, the following configuration.

The connecting portion 41 and the connecting portion 42 are assembled into the first housing. The electric connector 43 and the opto-electric conversion unit 44 are assembled into the second housing. The optical cord 10 when connected to the connecting portion 41 of the first housing is optically connected to the opto-electric conversion unit 44 of the second housing by a plurality of flexible light guide tubes, or light guide paths. Specifically, each light guide tube optically connects the optical fiber 11 of the optical cord 10 to the light emitting element 44a of the opto-electric conversion unit 44 one-to-one. The light guide tube is, for example, made of an optical fiber. Further, the connecting portion 42 of the first housing is electrically connected to the electric connector 43 of the second housing by a plurality of flexible conductive wires. Specifically, each conductive wire electrically connects the electric wire 21 of the electric cord 20 to a terminal of the electric connector 43 one-to-one. The conductive wire is, for example, a copper wire.

Figure 5:
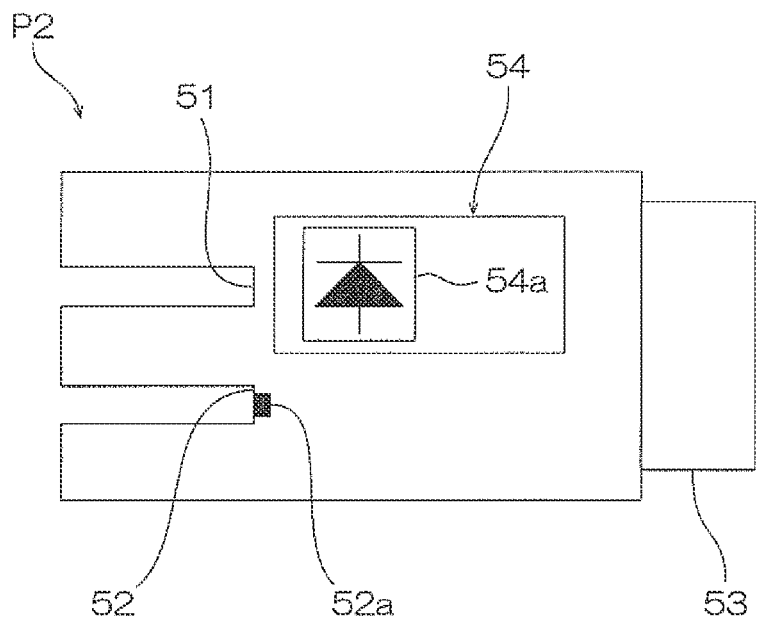
FIG. 5 shows a configuration schematic view of one example of a second plug shown in FIG. 1.

The plug P2 is a receiving-side plug connected to a receiving device of the video transmission, and as shown in FIG. 5, includes a connecting portion 51 connectable to the optical fibers 11, a connecting portion 52 connectable to the electric wires 21, and an electric connector 53 connectable to an external device. Further, the plug P2 includes an opto-electric conversion unit 54 for converting an optical signal into an electric signal. That is, the plug P2 has a configuration for converting the optical signal into the electric signal.

The connecting portion 51 is configured to be connectable to the optical fiber 11 in a form of being included in the optical cord 10, or is configured to be connectable to the optical fiber 11 in a form of being exposed outside the optical cord 10.

The connecting portion 52 is configured to be connectable to the electric wire 21 in a form of being included in the electric cord 20, or is configured to be connectable to the electric wire 21 in a form of being exposed outside the electric cord 20. The connecting portion 52 has the same number of terminals 52a as the electric wires 21 of the electric cord 20. The terminal 52a corresponds to the electric wire 21 one-to-one, and is contactable with the electric wire 21.

The electric connector 53 has a plurality of terminals (not shown). When the optical cable laying construction set X is for HDMI transmission, the number of terminals of the electric connector 53 is 19. A plurality of signal paths are formed between the electric connector 53 and the connecting portion 51, and a plurality of signal paths are formed between the electric connector 53 and the connecting portion 52.

The opto-electric conversion unit 54 includes the same number of light receiving elements 54a as the optical fibers 11 of the optical cord 10, and a drive circuit (not shown). Each light receiving element 54a is optically connected to the optical fiber 11 of the optical cord 10 one-to-one. The light receiving element 54a is, for example, a photodiode. Examples of the photodiode include PIN (p-intrinsic-n)-type photodiodes, MSM (metal semiconductor metal) photodiodes, and avalanche photodiodes. In the opto-electric conversion unit 54, the light receiving element 54a may be, for example, disposed so that light from the connecting portion 51 directly enters. Alternatively, the opto-electric conversion unit 54 may further include a lens-mirror material (not shown) for bending the optical path at, for example, 90 degrees, and the light receiving element 54a may be disposed so that the light from the connecting portion 51 enters the light receiving element 54a through the lens-mirror material.

The plug P2 may have a single housing. When the plug P2 has the single housing, various elements (including the connecting portion 51, the connecting portion 52, the electric connector 53, and the opto-electric conversion unit 54) of the plug P2 are assembled into the housing. Alternatively, the plug P2 may have a configuration in which the third housing and the fourth housing are provided, and the third housing and the fourth housing are connected in a flexible manner. In this case, the plug P2 has, for example, the following configuration.

The connecting portion 51 and the connecting portion 52 are assembled into the third housing. The electric connector 53 and the opto-electric conversion unit 54 are assembled into the fourth housing. The optical cord 10 when connected to the connecting portion 51 of the third housing is optically connected to the opto-electric conversion unit 54 of the fourth housing by a plurality of flexible light guide tubes, or light guide paths. Specifically, each light guide tube optically connects the optical fiber 11 of the optical cord 10 to the light receiving element 54a of the opto-electric conversion unit 54 one-to-one. The light guide tube is, for example, made of an optical fiber. Further, the connecting portion 52 of the third housing is electrically connected to the electric connector 53 of the fourth housing by a plurality of flexible conductive wires. Specifically, each conductive wire electrically connects the electric wire 21 of the electric cord 20 to a terminal of the electric connector 53 one-to-one. The conductive wire is, for example, a copper wire.

The optical cable laying construction method according to one embodiment of the present invention is a construction method using the optical cable laying construction set X, and includes a laying step, a first removal step, a first connecting step, a second removal step, and a second connecting step.

In the laying step, the optical cable C1 is laid between external devices as connection targets by the optical cable C1. A length of the optical cable C1 may be adjusted by cutting the optical cable C1 as needed with, for example, a cutter after the laying step and before the first removal step and/or the second removal step to be described later (cutting step). By passing through such a cutting step, it is possible to suppress the surplus of the optical cable C1 after laying.

Figure 6A:
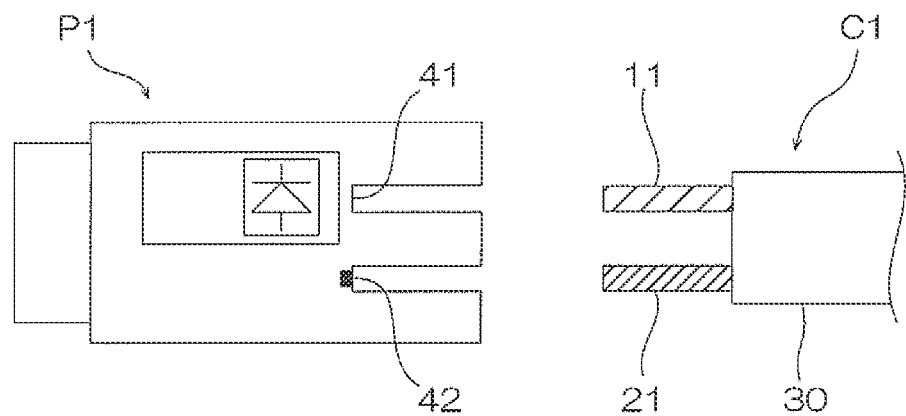
FIG. 6A shows a first removal step of a laying construction method using the optical cable laying construction set shown in FIG. 1.

In the first removal step, as shown in FIG. 6A, the cable jacket 30 is removed so that the optical fibers 11 and the electric wires 21 extend outside the cable jacket 30 in a one-end portion of the optical cable C1. The optical fibers 11 are made to extend outside the cable jacket 30 each in a form of being included in the optical cord 10 or exposed outside the optical cord 10. The electric wires 21 are made to extend outside the cable jacket 30 each in a form of being included in the electric cord 20 or exposed outside the electric cord 20. When the optical fibers 11 are made to extend outside the cable jacket 30 each in a form of being exposed outside the optical cord 10, in this step, the covering material 12 of the optical cord 10 is also removed in the one-end portion of the optical cable C1. When the electric wires 21 are made to extend outside the cable jacket 30 each in a form of being exposed outside the electric cord 20, the covering material 22 of the electric cord 20 is also removed in the one-end portion of the optical cable C1 in this step. In FIG. 6A, a form in which the optical fibers 11 and the electric wires 21 extend outside the cable jacket 30 is conceptually represented. The same applies to the subsequent process views.

Figure 6B:
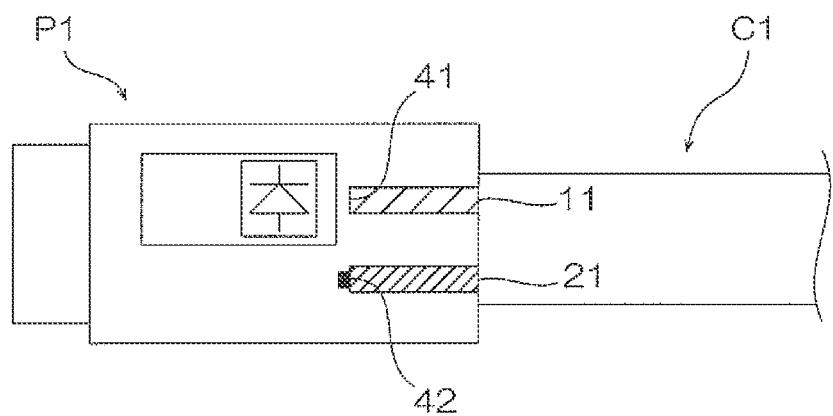
FIG. 6B shows a first connecting step of the method.

In the first connecting step, as shown in FIG. 6B, the optical fibers 11 extending outside the cable jacket 30 in the one-end portion of the optical cable C1 are connected to the connecting portion 41 of the plug P1, and the electric wires 21 extending outside the cable jacket 30 in the one-end portion of the optical cable C1 are connected to the connecting portion 42 of the plug P1.

Figure 7A:
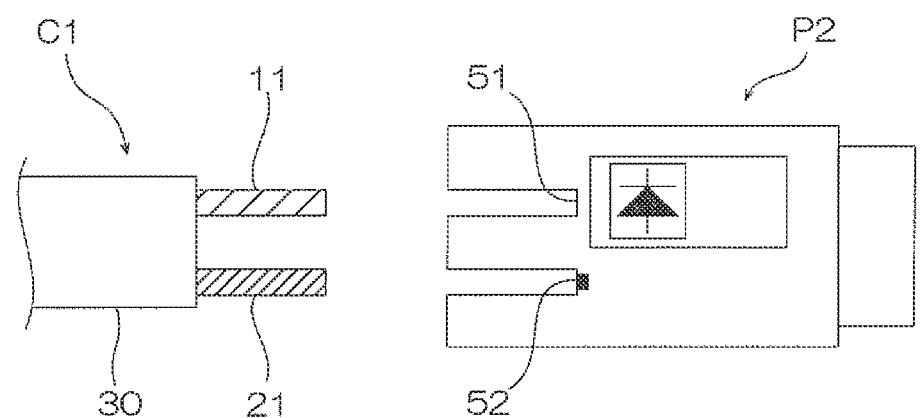
FIG. 7A shows a second removal step of a laying construction method using the optical cable laying construction set shown in FIG. 1.

In the second removal step, as shown in FIG. 7A, the cable jacket 30 is removed so that the optical fibers 11 and the electric wires 21 extend outside the cable jacket 30 in the other-end portion of the optical cable C1. The optical fibers 11 are made to extend outside the cable jacket 30 each in a form of being included in the optical cord 10 or exposed outside the optical cord 10. The electric wires 21 are made to extend outside the cable jacket 30 each in a form of being included in the electric cord 20 or exposed outside the electric cord 20. When the optical fibers 11 are made to extend outside the cable jacket 30 each in a form of being exposed outside the optical cord 10, the covering material 12 of the optical cord 10 is also removed in the other-end portion of the optical cable C1 in this step. When the electric wires 21 are made to extend outside the cable jacket 30 each in a form of being exposed outside the electric cord 20, the covering material 22 of the electric cord 20 is also removed in the other-end portion of the optical cable C1 in this step.

Figure 7B:
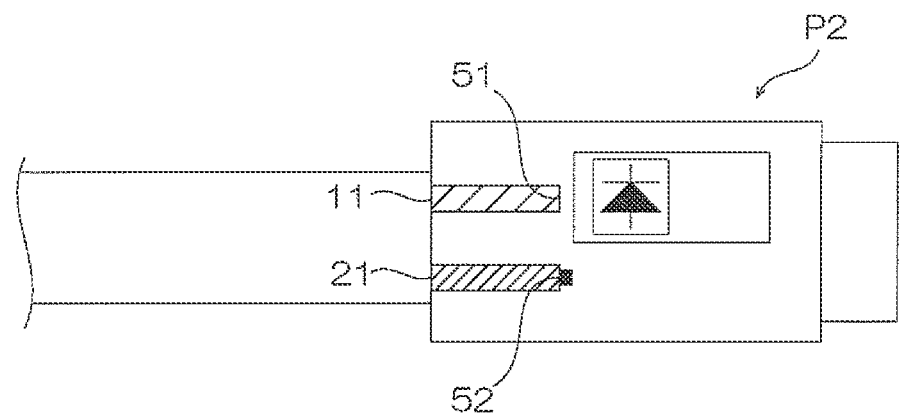
FIG. 7B shows a second connecting step of the method.

In the second connecting step, as shown in FIG. 7B, the optical fibers 11 extending outside the cable jacket 30 in the other-end portion of the optical cable C1 are connected to the connecting portion 51 of the plug P2, and the electric wires 21 extending outside the cable jacket 30 in the other-end portion of the optical cable C1 are connected to the connecting portion 52 of the plug P2.

The first removal step or the second removal step may be also carried out before the laying step. When the first removal step is carried out before the laying step, the first connecting step may be carried out before the laying step, and the second removal step and the subsequent second connecting step are preferably carried out after the laying step. When the second removal step is carried out before the laying step, the second connecting step may be carried out before the laying step, and the first removal step and the subsequent first connecting step are preferably carried out after the laying step.

According to the optical cable laying construction method, in the laying step, it is possible to lay the optical cable C1 between the external devices before the plugs P1 and P2 are attached to both end portions of the optical cable C1. The optical cable C1 with no plug on the cable end easily passes through a narrow space in the piping, in the wall, under the floor, etc.

Further, according to the present method, it is possible to adjust the length of the optical cable C1 by cutting the optical cable C1 as needed after laying the optical cable C1 between the external devices and before attaching the plugs P1 and P2 to both end portions of the optical cable C1. The present method is suitable for suppressing the surplus of the optical cable C1 after laying.

As described above, in the laying of the optical cable C1, the present method allows the optical cable C1 to easily pass through a narrow space, and is suitable for suppressing the surplus of the optical cable C1 after laying.

Figure 8:
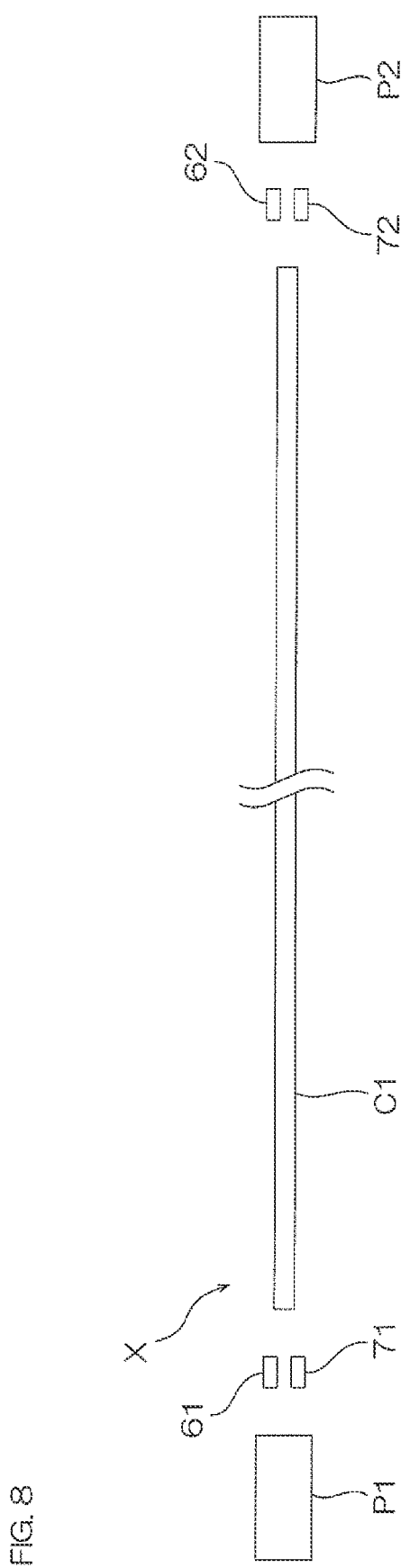
FIG. 8 shows a configuration schematic view of a modified example of the optical cable laying construction set shown in FIG. 1.

As shown in FIG. 8, the optical cable laying construction set X may further include optical connectors 61 and 62, and electric connectors 71 and 72 in addition to the optical cable C1 and the plugs P1 and P2. The optical connectors 61 and 62 are, for example, MT (mechanical transfer) connectors.

Figure 9A:
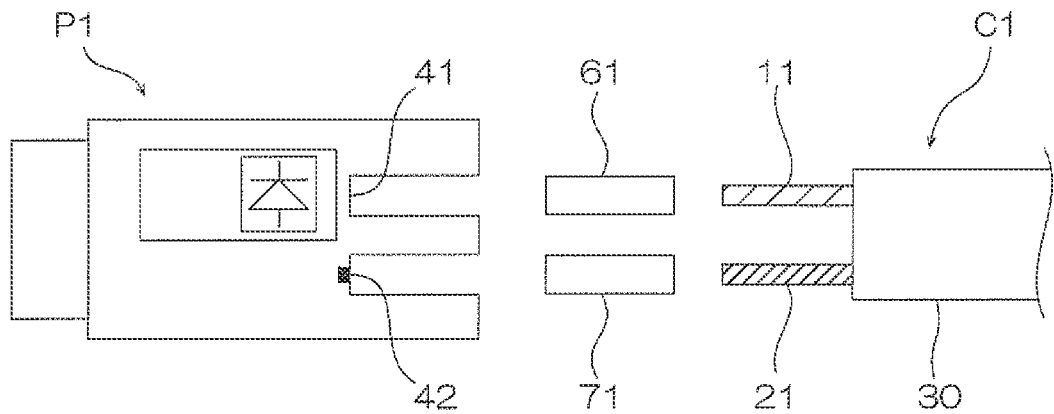
FIG. 9A shows a first removal step of a laying construction method using the optical cable laying construction set shown in FIG. 8, and FIGS. 9B and 9C show a first connecting step of the method.

In the optical cable laying construction set X, as shown in FIG. 9, the plug P1 is configured so that the optical connector 61 is connectable to the connecting portion 41 of the plug P1, and the optical fibers 11 in the optical cable C1 may be optically connected to the connecting portion 41 through the optical connector 61. Along with this, the plug P1 is configured so that the electric connector 71 is connectable to the connecting portion 42 of the plug P1, and the electric wires 21 in the optical cable C1 may be electrically connected to the connecting portion 42 through the electric connector 71. Further, as shown in FIG. 10, the plug P2 is configured so that the optical connector 62 is connectable to the connecting portion 51 of the plug P2, and the optical fibers 11 in the optical cable C1 may be optically connected to the connecting portion 51 through the optical connector 62. Along with this, the plug P2 is configured so that the electric connector 72 is connectable to the connecting portion 52 of the plug P2, and the electric wires 21 in the optical cable C1 may be electrically connected to the connecting portion 52 through the electric connector 72.

Figure 9B:
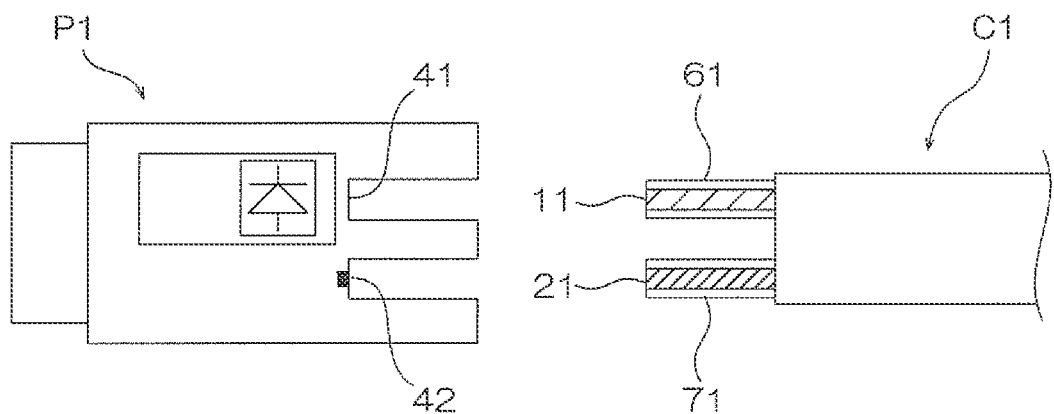
Figure 9C:
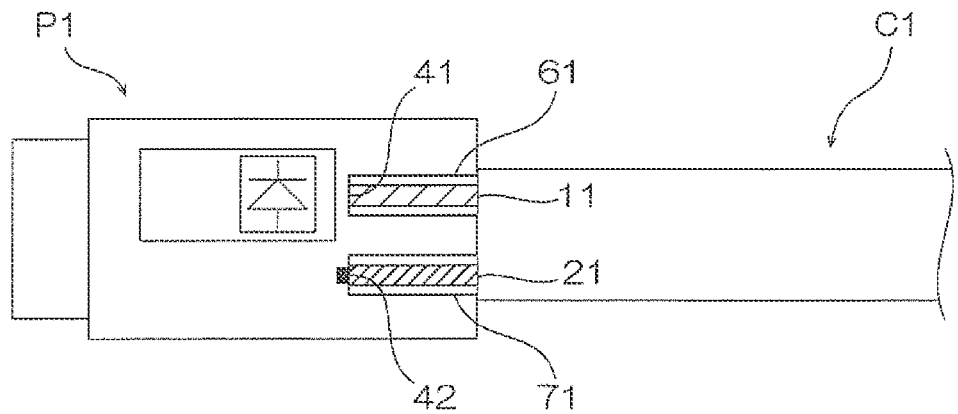
Figure 10A:
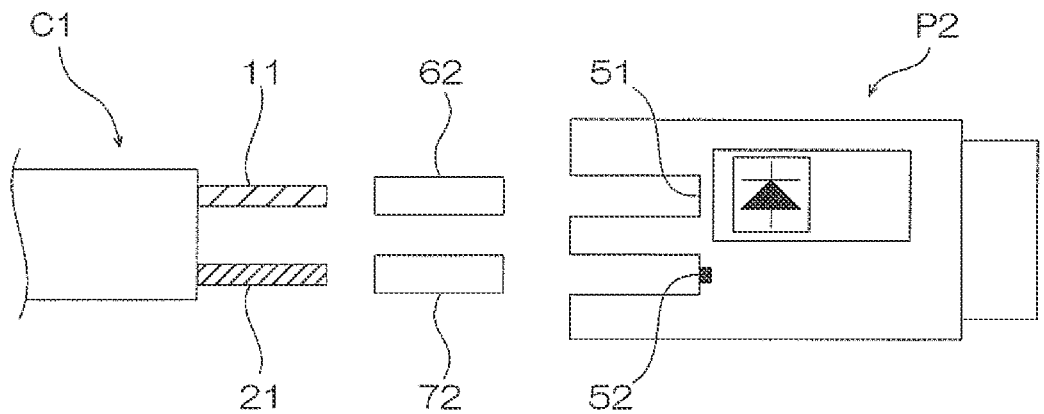
FIG. 10A shows a second removal step of a laying construction method using the optical cable laying construction set shown in FIG. 8, and FIGS. 10B and 10C show a second connecting step of the method.
Figure 10B:
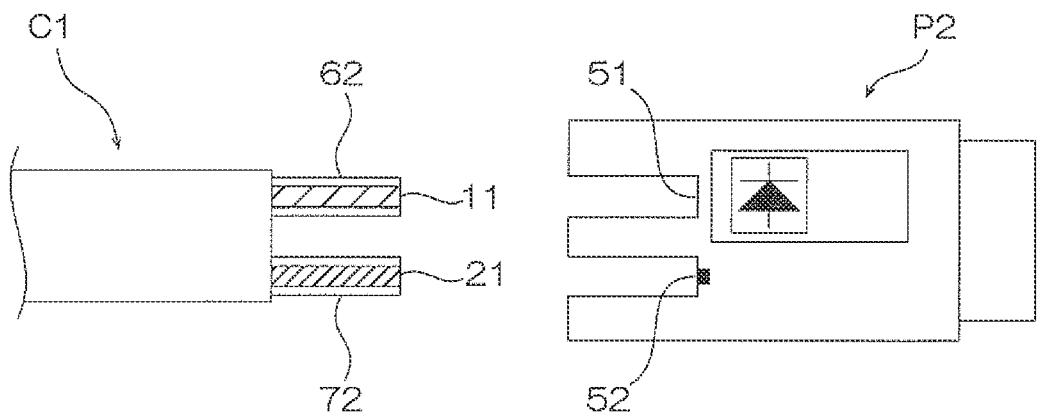
Figure 10C:
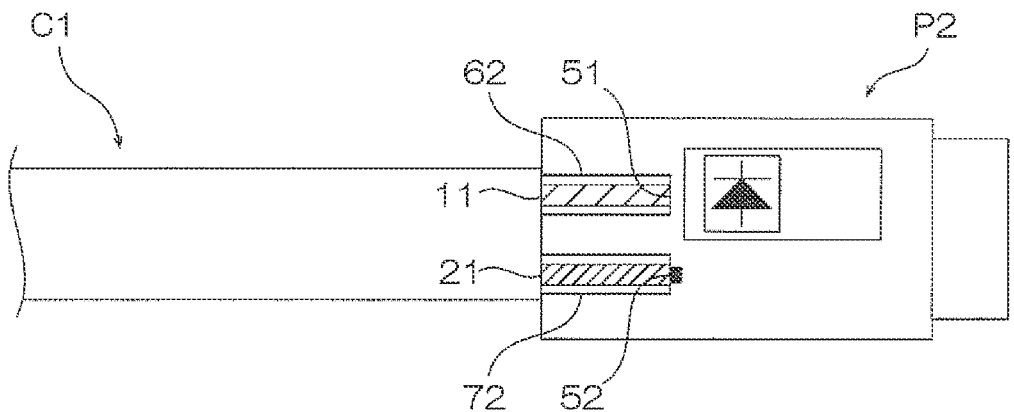

When this optical cable laying construction set X is used in the above-described optical cable laying construction method, in the first connecting step after the first removal step (shown in FIG. 9A), first, as shown in FIG. 9B, the optical fibers 11 which have been made to extend outside the cable jacket 30 in the first removal step are connected to the optical connector 61, and the electric wires 21 which have been made to extend outside the cable jacket 30 in the first removal step are connected to the electric connector 71. Next, as shown in FIG. 9C, the optical connector 61 is connected to the connecting portion 41 of the plug P1, and the electric connector 71 is connected to the connecting portion 42 of the plug P1. Further, in the second connecting step after the second removal step (shown in FIG. 10A), first, as shown in FIG. 10B, the optical fibers 11 which have been made to extend outside the cable jacket 30 in the second removal step are connected to the optical connector 62, and the electric wires 21 which have been made to extend outside the cable jacket 30 in the second removal step are connected to the electric connector 72. Next, as shown in FIG. 10C, the optical connector 62 is connected to the connecting portion 51 of the plug P2, and the electric connector 72 is connected to the connecting portion 52 of the plug P2.

The above-described optical connection through the optical connectors 61 and 62 is suitable for obtaining high connection reliability between the optical fibers 11 and the plugs P1 and P2. The above-described electric connection through the electric connectors 71 and 72 is suitable for obtaining high connection reliability between the electric wires 21 and the plugs P1 and P2.

Figure 11:
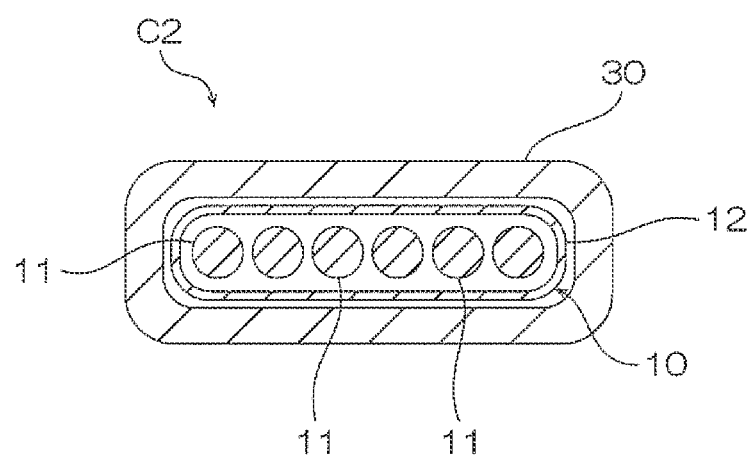
FIG. 11 shows a cross-sectional configuration view of another example of the optical cable shown in FIGS. 1 and 8.

The optical cable laying construction set X may include an optical cable C2 having a cross-sectional configuration shown in FIG. 11 instead of the optical cable C1. The optical cable C2 includes the optical cord 10, including optical fibers 11 and the covering material 12, and the cable jacket 30. The optical cable C2 is different from the optical cable C1 in that the number of optical fibers 11 is larger than the optical cable C1, and it does not include the electric cord 20. The number of optical fibers 11 in the optical cable C2 is, for example, six.

In this optical cable laying construction set X, the connecting portion 41 of the plug P1 has a configuration in which the optical fibers 11 of the optical cable C2 are connectable to the portion 41, and the plug P1 does not have the connecting portion 42. Further, the connecting portion 51 of the plug P2 has a configuration in which the optical fibers 11 of the optical cable C2 are connectable to the portion 51, and the plug P2 does not have the connecting portion 52.

When this optical cable laying construction set X is used in the above-described optical cable laying construction method, an electric cord connection operation is not required in the first connecting step and the second connecting step.

INDUSTRIAL APPLICATION

The optical cable laying construction method of the present invention can be applied to construction of an optical cable for video transmission such as HDMI transmission. The optical cable laying construction set of the present invention can be used for construction of an optical cable for video transmission such as HDMI transmission.

DESCRIPTION OF REFERENCE NUMERALS

X Optical cable laying construction set
C1, C2 Optical cable
10 Optical cord
11 Optical fiber
11a Core
11b Clad
11c Over clad
20 Electric cord
21 Electric wire
30 Cable jacket
P1, P2 Plug
41, 42 Connecting portion
43 Electric connector
44 Opto-electric conversion unit
44a Light emitting element
51, 52 Connecting portion
53 Electric connector
54 Opto-electric conversion unit
54a Light receiving element
61, 62 Optical connector

The invention claimed is:

1. An optical cable laying construction method at a construction site for connecting external devices by an optical cable using an optical cable laying construction set, the optical cable laying construction set comprising:
   an optical cable including a refractive index distribution-type plastic optical fiber and a cable jacket;
   a first plug including a first connecting portion and a first electric connector, and having a configuration for converting an electric signal into an optical signal, the first connecting portion being connectable to the plastic optical fiber, the first electric connector being connectable to an external device; and
   a second plug including a second connecting portion and a second electric connector, and having a configuration for converting an optical signal into an electric signal, the second connecting portion being connectable to the plastic optical fiber, the second electric connector being connectable to an external device,
   the optical cable laying construction method comprising:
   a laying step of laying the optical cable;
   a first removal step of removing, in a one-end portion of the optical cable, a cable jacket so that the plastic optical fiber extends outside the cable jacket;
   a first connecting step of connecting the plastic optical fiber extending outside the cable jacket in the one-end portion to the first connecting portion of the first plug;
   a second removal step of removing, in an other-end portion of the optical cable, the cable jacket so that the plastic optical fiber extends outside the cable jacket; and
   a second connecting step of connecting the plastic optical fiber extending outside the cable jacket in the other-end portion to the second connecting portion of the second plug;
   wherein in the first connecting step, applying a first optical connector separate from the first plug and from the optical cable, to the optical cable to cover the plastic optical fiber extending outside the cable jacket in the one-end portion of the optical cable, and upon insertion of the optical cable into the first plug, connects the plastic optical fiber to the first connecting portion of the first plug.

2. The optical cable laying construction method according to claim 1 further comprising:
   a step of cutting the optical cable before the first removal step and/or the second removal step.

3. The optical cable laying construction method according to claim 1, further comprising:
   in the second connecting step, applying a second optical connector separate from the second plug and from the optical cable, to the optical cable to cover the plastic optical fiber extending outside the cable jacket in the other-end portion of the optical cable, and upon insertion of the optical cable into the second plug, connects the plastic optical fiber to the second connecting portion of the second plug.

4. The optical cable laying construction method according to claim 1, further comprising:
   providing an electric wire in the optical cable;
   providing a third connecting portion connectable to the electric wire in the first plug; and
   providing a fourth connecting portion connectable to the electric wire in the second plug.

5. The optical cable laying construction method according to claim 4, further comprising:
   in the first connecting step, applying a third electric connector separate from the first plug and from the optical cable, which is applied to the optical cable to cover the electric wire extending outside the cable jacket in the one-end portion, and upon insertion of the optical cable into the first plug, connects the electric wire to the third connecting portion of the first plug.

6. The optical cable laying construction method according to claim 5, further comprising:
   in the second connecting step, applying a fourth electric connector separate from the second plug and from the optical cable, which is applied to the optical cable to cover the electric wire extending outside the cable jacket in the other-end portion, and upon insertion of the optical cable into the second plug, connects the electric wire to the fourth connecting portion of the second plug.

7. An optical cable laying construction set for being assembled at a construction site, comprising:
   an optical cable including a refractive index distribution-type plastic optical fiber and a cable jacket;
   a first plug including a first connecting portion and a first electric connector, and having a configuration for converting an electric signal into an optical signal, the first connecting portion being connectable to the plastic optical fiber, the first electric connector being connectable to an external device;
   a second plug including a second connecting portion and second electric connector, and having a configuration for converting an optical signal into an electric signal, the second connecting portion being connectable to the plastic optical fiber, the second electric connector being connectable to an external device; and
   a first optical connector separate from the first plug and from the optical cable, which is applied to the optical cable, and which covers the plastic optical fiber of the optical cable, and upon insertion of the optical cable into the first plug, connects the plastic optical fiber to the first connecting portion of the first plug.

8. The optical cable laying construction set according to claim 7,
   wherein the plastic optical fiber includes a core, a clad around the core, and an over clad around the clad, wherein the core and the clad have an elastic modulus of 0.5 to 20 GPa, wherein the over clad has an elastic modulus of 0.5 to 10 GPa.

9. The optical cable laying construction set according to claim 7, further comprising:

a second optical connector separate from the second plug and from the optical cable, which is applied to the optical cable, and which covers the plastic optical fiber of the optical cable, and upon insertion of the optical cable into the second plug, connects the plastic optical fiber to the second connecting portion of the second plug.

10. The optical cable laying construction set according to claim 7, further comprising:

an electric wire included in the optical cable;

wherein the first plug includes a third connecting portion connectable to the electric wire; and wherein the second plug includes a fourth connecting portion connectable to the electric wire.

11. The optical cable laying construction set according to claim 10, further comprising:

a third electric connector separate from the first plug and from the optical cable, which is applied to the optical cable, and which covers the electric wire of the optical cable, and upon insertion of the optical cable into the first plug, connects the electric wire to the third connecting portion of the first plug.

12. The optical cable laying construction set according to claim 11, further comprising:

a fourth electric connector separate from the second plug and from the optical cable, which is applied to the optical cable, and which covers the electric wire of the optical cable, and upon insertion of the optical cable into the second plug, connects the electric wire to the fourth connecting portion of the second plug.

* * * * *